US007996770B2

(12) United States Patent
Chakravarthy

(10) Patent No.: US 7,996,770 B2
(45) Date of Patent: Aug. 9, 2011

(54) PORTAL INTERACTION USING ONTOLOGY-BASED DICTIONARIES

(75) Inventor: Ananth Kalyan Gundabattula Chakravarthy, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 1035 days.

(21) Appl. No.: 11/835,742

(22) Filed: Aug. 8, 2007

(65) Prior Publication Data
US 2009/0044099 A1 Feb. 12, 2009

(51) Int. Cl.
G06F 17/00 (2006.01)
(52) U.S. Cl. ......... 715/273; 715/200; 715/243; 715/259
(58) Field of Classification Search .................. 715/273, 715/243, 259, 200
See application file for complete search history.

(56) References Cited

U.S. PATENT DOCUMENTS

| | | | |
|---|---|---|---|
| 7,281,217 B2* | 10/2007 | Choudhary et al. | 715/764 |
| 7,475,354 B2* | 1/2009 | Guido et al. | 715/742 |
| 7,533,142 B2* | 5/2009 | Ng et al. | 709/202 |
| 7,725,560 B2* | 5/2010 | Bales et al. | 709/217 |
| 7,774,332 B2* | 8/2010 | Roy-Chowdhury et al. | 707/707 |
| 2004/0199392 A1* | 10/2004 | Khatri et al. | 704/277 |
| 2005/0015293 A1* | 1/2005 | Henn et al. | 705/9 |
| 2005/0283524 A1* | 12/2005 | Kim | 709/217 |
| 2006/0004913 A1 | 1/2006 | Chong | |
| 2006/0015843 A1 | 1/2006 | Sabbouh | |
| 2006/0031377 A1* | 2/2006 | Ng et al. | 709/208 |
| 2006/0184883 A1* | 8/2006 | Jerrard-Dunne et al. | 715/742 |
| 2007/0282673 A1* | 12/2007 | Nagpal et al. | 705/11 |
| 2007/0283020 A1* | 12/2007 | Chowdary et al. | 709/227 |
| 2007/0283271 A1* | 12/2007 | Lection et al. | 715/733 |
| 2007/0283281 A1* | 12/2007 | Ainsworth et al. | 715/760 |
| 2009/0006578 A1* | 1/2009 | Schaeck | 709/217 |

FOREIGN PATENT DOCUMENTS
WO WO 2004031985 A2 4/2004

OTHER PUBLICATIONS

Priebe, T., "INWISS—Integrative Enterprise Knowledge Portal," Proceedings of 3rd International Semantic Web Conference (ISWC 2004), Hiroshima, Japan (2004).

* cited by examiner

Primary Examiner — Thu V Huynh
(74) Attorney, Agent, or Firm — Hamilton, Brook, Smith & Reynolds, P.C.

(57) ABSTRACT

A portal includes one or more portal pages. Each portal page is associated with one or more ontology-based dictionaries. One or more portlets provide content for the portal pages, such that each portal page includes instances of one or more of the portlets. Each portal page is associated with the dictionaries and described using these dictionaries. Each portlet is associated with the ontology-based dictionaries and described using these dictionaries. A broker governs interaction among the portlets and between the portlets and the portal pages by using the ontology-based dictionaries. For instance, the broker governs interaction among the portlets, and between the portlets and the portal pages, by using the ontology-based dictionaries in that properties of the portlets and/or properties of the portal pages that are differently named but correspond to a same attribute are equated as identical via the ontology-based dictionaries.

20 Claims, 3 Drawing Sheets

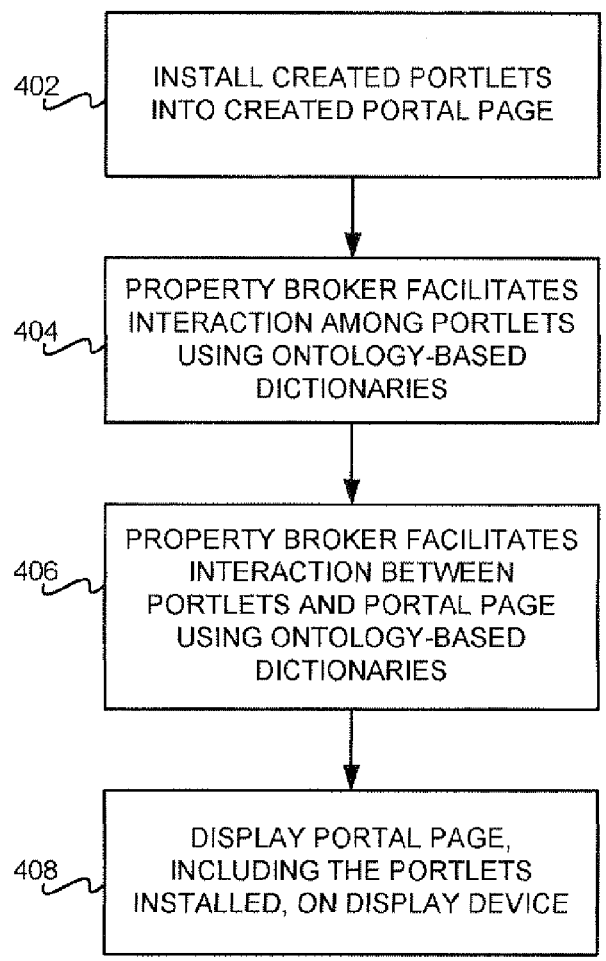

PORTAL INTERACTION USING ONTOLOGY-BASED DICTIONARIES

FIELD OF THE INVENTION

The present invention relates generally to portals having portal paces that include portlets, and more particularly to defining such portal pages and portlets using ontology-based dictionaries and to governing interaction among the portal pages and the portlets using the ontology-based dictionaries.

BACKGROUND OF THE INVENTION

One type of portal is a web portal, which is typically web site that offers a broad array of resources and services typically targeted towards specific categories of users. Portals are rapidly gaining, popularity and widespread adoption because they provide end users with unified access to applications, content, and collaboration services. Portals help corporate information technology (IT) staff and other users by allowing them to integrate independently developed applications in a cost-effective manner. Portals also help site owners by allowing them to provide a consistent, branded experience to their users while retaining control over the individual user experience.

A portal is thus made up of individual portal web pages, or simply portal pages. In some types of portal frameworks, a web portal model may include a scheme for aggregating and integrating portlets into the portal pages of a web portal. A portlet is an application that underlies a window within a portal web page. Portlets are typically reusable web components that display relevant information to portal users. Examples for portlets are: email, weather, discussion forum, news, and so on. For a given set of portlets, a portal framework provides flexibility in terms of how the portlets can be used. A given portlet may be an independently developed web application. Thus, the creator of a portal can choose selected portlets from different vendors and organize and integrate them in a desired manner within one or more portal pages of the portal.

A disadvantage with the utilization of portlets to construct portal pages of a web portal is that common attributes among portlets and among portal pages typically have to be named the same, or explicitly corresponded as being identical via manual and laborious specification, for the portlets to interact with one another and with the portal pages. For example, one portlet may refer to an email address as email_address, whereas another portlet nay refer to an email address as an email_ID. These two portlets cannot automatically interact with one another via such an email address, insofar as the property names for this attribute are different between the two portlets. Given the capability of a portal to run portlets from different vendors, this disadvantage can be even more apparent. Rather, the creator of a web portal may have to manually wire the email_address property to the email_ID property for such interaction to occur. When there are large numbers of portals having large numbers of such attributes, a disadvantage is that this process can become laborious and time consuming.

As such, the full potential of portlets in constructing portal pages of web portals may not be realized. Portlets dealing with the same types of attributes, like email addresses, may not be able to interact with one another to provide the full synergism among the portlets that may otherwise be expected. Without a way to efficiently provide synergism between various portals the promise of this technology may never be fully achieved.

SUMMARY OF THE INVENTION

The present disclosure relates to a portal having portal pages and portlets defined and interacting using ontology-based dictionaries. A system of an embodiment of the invention includes one or more computing devices. A web portal runs on the computing devices, and includes one or more portal pages. Each portal page is associated with one or more ontology-based dictionaries. One or more portlets provide content for the portal pages, such that each portal page includes instances of one or more of the portlets. Each portlet is also associated with the ontology-based dictionaries. A broker running on the computing devices is configured to govern interaction among the portlets and between the portlets and the portal pages by using the ontology-based dictionaries, such that inter-portlet communication is achieved using the semantic meaning of the portlet properties.

A method of an embodiment of the invention is for creating a portal page of a web portal. The web portal runs on one or more computing devices. The method describes the portal page at least by using one or more ontology-based dictionaries. The method installs one or more portlets within the portal page. Each portlet is defined at least by using the ontology-based dictionaries, and provides content for the portal page. A broker facilitates interaction between the portal page and the portlets by using the ontology-based dictionaries such that properties of the portlets and properties of the portal pages that are differently named but correspond to a same attribute are equated as identical by the ontology-based dictionaries. The method displays the portal page including the portlets on a display device for viewing by a user.

A computer-readable medium of an embodiment of the invention has one or more computer programs stored thereon to perform a method. The computer-readable medium may be a recordable data storage medium, or another type of tangible computer-readable medium. The method creates one or more portlets, and describes each portlet at least by using one or more ontology-based dictionaries. The method creates a portal page of a web portal, which runs on one or more computing devices. The method describes the portal page at least by using the ontology-based dictionaries, and installs the portlets within the portal page. Each portlet provides content for the portal page. A broker facilitates interaction among the portlets by using the ontology-based dictionaries such that the properties of the portlets that are differently named but correspond to a same attribute are equated as identical by the ontology-based dictionaries. The broker further facilitates interaction between the portal page and the portlets by using the ontology-based dictionaries such that properties of the portlets and properties of the portal pages that are differently named but correspond to a same attribute are equated as identical by the ontology-based dictionaries. The method displays the portal page including the portlets on a display device for viewing by a user.

Embodiments of the invention provide for certain advantages over the prior art. For example, portlets that refer to the same attribute but which label this attribute with different property names can nevertheless interact with one another. For example, a portlet referring an email address as email_address and a portlet referring to an email address as email_ID can still interact with one another on the basis of an email address. The portlets and portal pages are defined so that their properties are associated with ontology-based dictionaries. As such, a broker is able to correlate different property names among different portlets (and portal pages) as referring to the same attribute by using these ontology-based dictionaries. Web portals therefore become more robust and more easily and richly created. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 4 is a flowchart of a method for employing constructed portlets within a constructed portal page, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
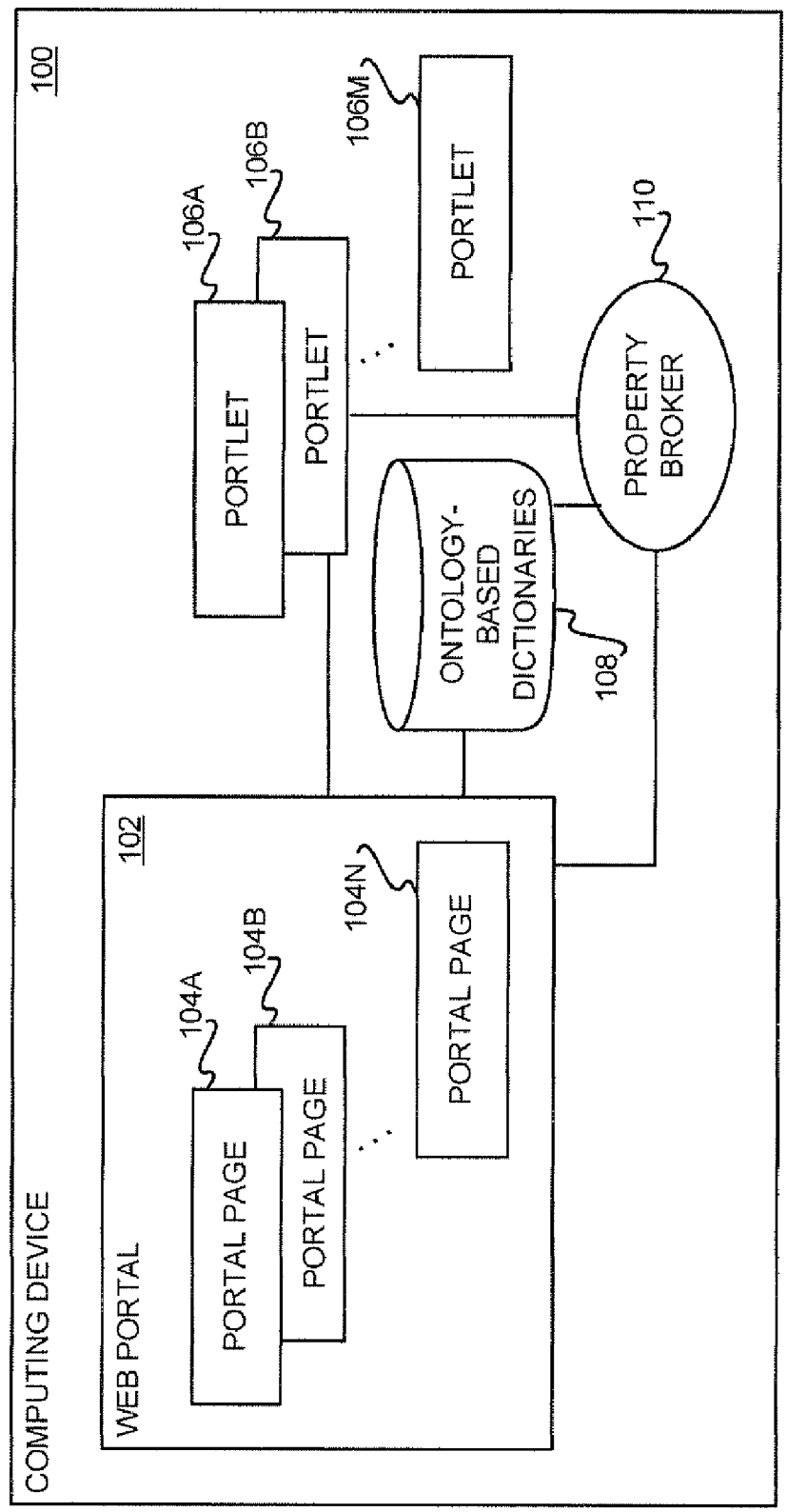
FIG. 1 is a diagram of a computing device on which a web portal runs, according to an embodiment of the invention.

FIG. 1 shows a computing device 100, according to an embodiment of the invention. As can be appreciated by those of ordinary skill within the art, the computing device 100 includes hardware, such as processors, memory, storage devices like hard disk drives, network adapters, and so on. Thus, it can be said that the computing device 100 is implemented at least in such hardware. The computing device 100 may be a server computing device, for instance. The computing device 100 may be part of a system, such as a computerized system including the computing device 100. While just one computing device 100 is depicted in FIG. 1 for illustrative convenience, the various components of the computing device 100 can be considered also as running on more than one such computing device 100 in one embodiment. In such an embodiment, a system may be considered as including all such computing devices 100.

A web portal 102 runs on the computing device 100. The web portal 102, or simply a portal, is a web site that offers a broad array of resources and services typically targeted towards specific categories of users. The web portal 102 includes a number of portal web pages, or portal pages, 104A, 104B, ..., 104N, collectively referred to as the portal pages 104. Each of the portal pages 104 includes instances of one or more of portlets 106A, 106B, ..., 106M, collectively referred to as the portlets 106. As understood by those of ordinary skill within the art, a portlet is an application that underlies a window within a portal web page, and may be an independently developed web application. The portlets 106 provide content for the portal pages 104, based on the different kinds of functionality ascribed to the portlets 106.

The portal pages 104 and the portlets 106 are each defined by (i.e., associated with) using one or more ontology-based dictionaries 108. Each of the ontology-based dictionaries 108 is said to have a number of dictionary entries, where each dictionary entry is an ontology element having one or more properties. An ontology-based dictionary is a data dictionary in which terms are related through hierarchies and other relationships derived from ontologies. Thus, an ontology-based dictionary combines a data dictionary with a logical data model, providing a consistent and logical world view, as can be appreciated by those of ordinary skill within the art.

An ontology-based dictionary exists to solve a disadvantage as to how one element, such as a portal page or a portlet, knows what the terms (i.e., properties or attributes) used by another element, such as another portal page or a portlet, mean. For example if one portlet uses the term email_address to signify an email address, and another portlet uses the term email_ID to signify an email address, an ontology-based dictionary is used to denote that both of these terms refer to the same identical property or attribute, an email address. Ontology-based dictionaries thus provide for interoperability among the portlets 106 and the portal pages 104. Examples of ontology-based dictionaries include the GCIDE, which is a collaborative international dictionary of English and available at the Internet web site www.ibiblio.org/webster), as well as SENSUS, which is an extension to wordnet and is described at the Internet web site wordnet.princeton.edu/links.

A property broker 110 also operates on the computing device 100. The property broker 110 manages and governs interaction among the portlets 106, as well as between the portlets 106 and the portal pages 104, by using the ontology-based dictionaries 108. The property broker 110 therefore learns the properties and attributes that the portal pages 104 and the portlets 106 are defining, and by virtue of the ontology-based dictionaries 108, can equate differently named properties among the portal pages 104 and the portlets 106 as being identical attributes. In the example of the previous paragraph, then, it is the property broker 110 that denotes to a first portlet that the property named email_ID used by a second portlet refers to the identical attribute—email address—as the property named email_address that may be used by the first portlet. In this way, the property broker 110 facilitates cooperation among the portlets 106, and between the portal pages 104 and the portlets 106.

The remainder of the detailed description section is organized as follows. In particular, detailed examples are provided, the explanation of which presents how the portal pages 104 of the web portal 102 and how the portlets 106 are defined using the ontology-based dictionaries 108. This explanation also presents how the property broker 110 may be used to govern interaction between the portal pages 104 and the portlets 106, as well as among the portlets 106 themselves. Various methods are provided in relation to this description that indicate how portal pages and portlets can be constructed and used.

A portal user within an organization, therefore, may have located a portlet called automated conference portlet. This portlet may have the following aspects. First, the portlet automatically sends invitations to all users only if these users are logged in to the protal. Second, the portlet states that it listens to properties, or attributes, with the following property names: email_ID, PersonName, and chatID. Third, either of the first two aspects can be used by another, source portlet to provide information to the target portlet. For example, the automated conference portlet can receive email_ID, Person-Name, and chatID information from other portlets. Fourth, the portlet can communicate with instant-messaging (IM) chat servers using a protocol to continuously ping these servers to determine if a current list of people it has received from other portlets on the current portal page, and send meeting invitations to these users. If the users are online, a conference can be initiated immediately. Fifth, the portlet has an edit mode in which there is an option to discontinue the conference if a particular user has left the conference.

Current web portal technology may allow a user to place the portlet within a portal web page, like a collaboration page, besides an email portal. If the email portal refers to the same attributes by the same names email_ID, PersonName, and chatID, then the automated conference portlet is able to receive such information from the email portal. However, if it does not, then the user has to manually "wire" the two portlets together to manually specify property names between the two portals that refer to the same attribute. In one embodiment of the invention, by comparison, such wiring is achieved dynamically, by using ontology-based dictionaries, so that the portals can automatically communicate with one another without any manual intervention by the user to map property names between the two portals for identical attributes.

Furthermore, the utilization of such dynamic wiring provides for other advantages. For example, the web portal itself may be able to suggest that the automated conference portlet be used on a sales portal page of the portal, so that the portal user can communicate with sales personnel, end customers, and so on. Thus, those of ordinary skill within the art can appreciate that using ontology-based dictionaries to dynamically wire portlets referring to the same attributes by different property names can provide for advantages in addition to just allow such dynamic wiring and not having to manually wire the portlets and portal pages.

Figure 2:
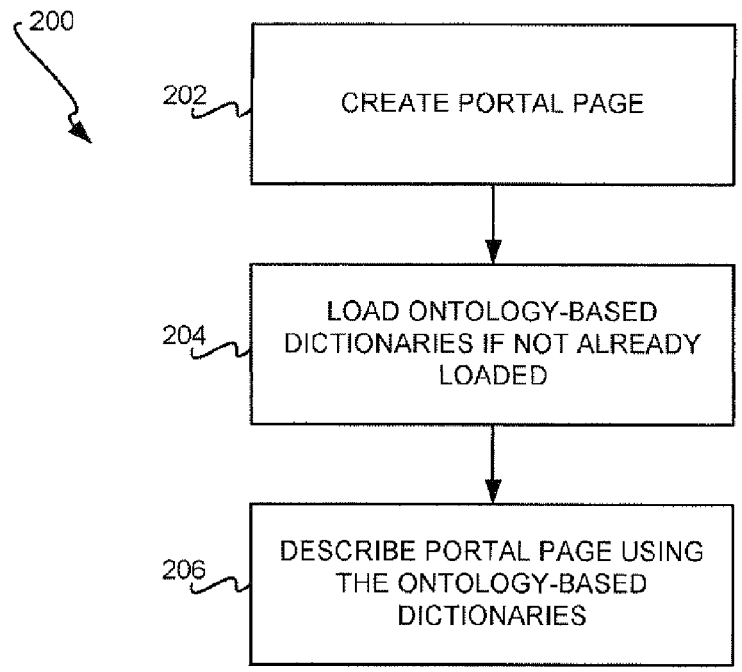
FIG. 2 is a flowchart of a method for constructing a portal page, according to an embodiment of the invention.

FIG. 2 shows a method 200 for constructing a portal page of a web portal, according to an embodiment of the invention. A user first creates a portal page (202). For instance, the user may instantiate a blank portal page, and ascribe the portal page with some basic purpose, such as a messaging portal page, a news portal page, and so on. If not, or the desired ontology-based dictionaries are not already loaded, then the user also loads these ontology-based dictionaries (204).

Finally, the user describes the portal page that has been created, using the ontology-based dictionaries (206), so that the attributes and properties of the portal page are provided with meaning. For example, a user may have created a portal page with the title sales tracking, such that he or she associates ontology-based sales and business dictionaries with this portal page. The business dictionary may contain the rules for making a business and define words such as buyer and seller. The sales dictionary may explain terms like goods, sell, godown, salesperson, customer, and so on.

Loading these dictionaries may in turn cause other ontology-based dictionaries to be loaded, such as a basic business entities ontology-based dictionary. Such a business entities dictionary may contain entries for employee, contractor, communication, email, and so on. Thus, the business and sales dictionaries may reference the business entities dictionary, and all three dictionaries may be used to inform the meaning of the terms in the portal page. It is noted, for instance, that the term buyer in the business dictionary semantically may mean the same as customer within the sales dictionary, and this relationship may be specified within the business entities dictionary, or within the business and/or sales dictionaries.

Each entry within each dictionary may be specified with OWL syntax, the web ontology language, as can be appreciated by those of ordinary skill within the art. For example, the entry "goods" within the sales dictionary may be defined as follows in a markup language.

```
<owl:ObjectProperty rdf:ID="transported">
    <rdfs:domain rdf:resource="#Thing"/>
    <rdfs:range rdf:resource="#Vehicle"/>
</owl:ObjectProperty>
<owl:Class rdf:ID="Goods">
    <rdfs:subClassOf rdf:resource="&business;Thing"/>
</owl:Class>
```

This entry says that a "good" is a thing and it can be assigned a property "transported" with the range being vehicles. In other words, at any point of time, an instance of the class type "good" can be created and it can be stated that the instance is being transported by an instance of vehicle. This OWL syntax can thus be referenced for a detailed understanding of what a "good" is.

The user uses this same OWL syntax to specify that the portal page that has been created is related to some business process, such as transportation of goods like books using company trucks. The user may describe the portal page using OWL syntax in the following manner:

```
<Goods rdf:id="books">
    <transported>trucks</transported>
</Goods>
```

Similarly, other entries can be constructed about the sales tracking page by using the following ontology-based dictionary syntax entries that describe the page.

```
<truck rdf:id="">
    <drivenBy>driverEmployee/drivenBy>
</truck>
<Employee rdf:id="">
    <communicates>Employee</communicates>
</Employee>
<driver>
    <rdf:type rdf:id="Employee"/>
</driver>
```

In this way, therefore, the business logic of a portal page is described using ontology-based dictionaries.

Figure 3:
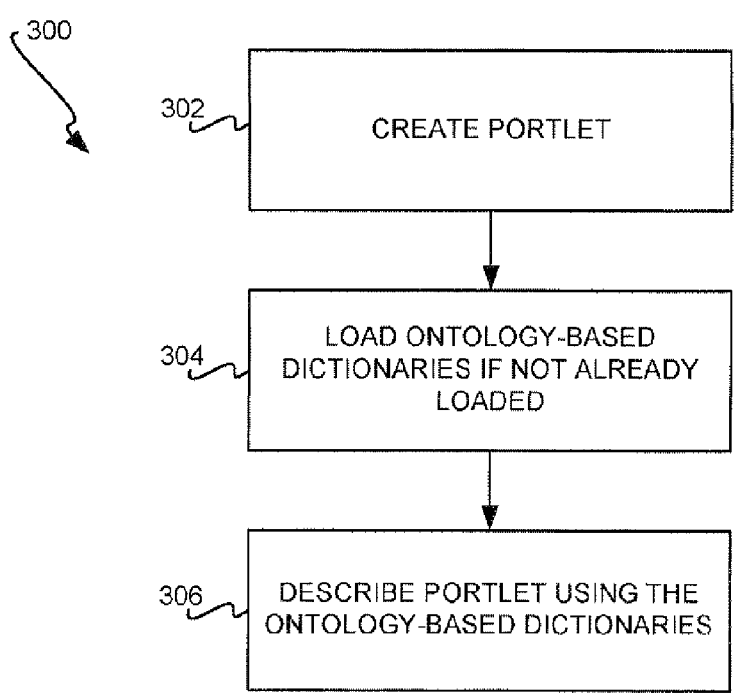
FIG. 3 is a flowchart of a method for constructing a portlet, according to an embodiment of the invention.

FIG. 3 shows a method 300 for constructing a portlet that can be instantiated within a portal page of a web portal, according to an embodiment of the invention. A user first creates a portlet (302). The creation of a portlet may be achieved by using preexisting computer programming tools which are conventional and understood within the art. The creation of a portlet can include the creation of the properties of the portlet, as can be appreciated by those of ordinary skill within the art. Next, as with the construction of a portal page, one or more ontology-based dictionaries are loaded if they are not already present (304).

Finally, the portlet developer or the administrator describes the portlet that has been created, using the ontology-based dictionaries (306), so that the attributes and properties of the portlet are provided with meaning. A portlet may be described using an ontology-based dictionary syntax that defines the functionality of the portlet. The portlet may also be described using an ontology-based dictionary syntax that defines properties that can be input into the portlet, where the portlet is a target portlet in relation to one or more source portlets, as well as by using an ontology-based dictionary syntax that defines properties that can be output from the portlet, where the portlet is a source portlet in relation to one or more target portlets. It is noted that a portlet can be both a target portlet and a source portlet.

For example, for the automated conference portlet that has been described previously, the functionality of the portlet may be defined as follows:

```
<Person>
    <communicates>group</communicates>
    <uses>email</uses>
    <uses>PersonName</uses>
    <uses>chatID</uses>
</Person>
```

Such a portlet is a cooperative portlet, and is specifically a target portlet that receives properties from other, source portlets. The target properties of this portlet may thus be defined as follows:

```
<inputProperty>
    <propertyName>email_ID</propertyname>
    <propertyType>email</propertyType>
</inputProperty>.
```

The ontology-based dictionaries employed to provide these terms with meaning can be the same as those used in relation to the construction of a portal page, or they may be different ontology-based dictionaries. It is noted that one or more computer programs may encompass a registry that describe the portlets and the portal pages hosted by an instance of a portal server, to provide for improved search capabilities inside the portal, as can be appreciated by those of ordinary skill within the art.

FIG. 4 shows a method 400 for using constructed portlets within a constructed portal page of a web portal, according to an embodiment of the invention. The user configures one or more portlets that have been installed earlier into a given portal page (402) provided he or she has been given appropriate permissions to configure his or her own page. Importantly, the user does not have to define the relationships among the portlets, and between the portlets and the portal page, to specify the different property names that may be being used for the same (identical) attributes. Rather, the property broker facilitates the interaction among portlets using the ontology-based dictionaries associated with the portlets (404). Likewise, the property broker facilitates interaction between the portlets and the portal page using the ontology-based dictionaries associated with the portlets and the portal page (406). As such, properties of the portlets and/or portal page that are differently named but correspond to the same attribute are equated as identical via the property broker's use of these ontology-based dictionaries, to facilitate such cooperation and interaction among and between the portlets and the portal page.

For example, the property broker may associate the output property of a portlet in a sales portal page. In the sales portal page that has been described above, it may be assumed that there are two portlets: a SalesOrderTracking portlet and a CustomerInfo portlet. The SalesOrderTracking portlet outputs the emailID of the truck driver who is carrying the books collection to a customer with the property name "emailID". The automated conference portlet that has been described may be listening to the property "email_ID". Thus, by using the ontology-based dictionaries, the property broker analyzes the semantic meaning of emailID and email_ID, and determines that they both refer to the same attribute, an email address. As such, the SalesOrderTracking portlet can interact and cooperate with the automated conference portlet without any manual wiring between the two portlets by the user. Rather, such wiring is dynamically achieved, without user interaction, by the property broker determining that the different property names of these two portlets refer to the same attribute.

As has been described previously, such dynamic semantic meaning determination provides for advantages above and beyond dynamic, automatic wiring among portlets and between portlets and portal pages. For example, a user may plan to personalize his or her sales portal page, and upon doing so, may be prompted for the automated conference portlet. This is because the property broker can perform a semantic analysis on the sales portal page and the automated conference portlet, and conclude that attributes of the former can be used as input to the latter, even if they are named differently. Thus, the property broker has parsing functionality to parse the ontology-based dictionaries to perform semantic analyses on property names of portal pages and portlets, to determine the meanings of such names, so that portal pages and portlets can interact and cooperate with one another.

The method 400 concludes by actual utilization of the portal page—that is, by displaying the portal page, including the installed portlets, on a display device for viewing by the user (408). The method 400, and other methods of embodiments of the invention, can be implemented as one or more computer programs stored on a computer-readable medium. Such a computer-readable medium may be a recordable data storage medium, or another type of tangible computer-readable medium.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

I claim:

1. A system comprising:
    one or more computing devices;
    a web portal operating on the computing devices;
    one or more portal pages of the web portal, each portal page associated with one or more ontology-based dictionaries;
    one or more portlets providing content for the portal pages, such that each portal page including instances of one or more of the portlets, each portlet associated with the ontology-based dictionaries; and
    a broker operating on the computing devices and governing interaction among the portlets and between the portlets and the portal pages by utilizing the ontology-based dictionaries, the broker facilitating interaction between the portal page and the portlets by using the ontology-based dictionaries such that properties of the portlets and properties of the portal pages that are differently named but correspond to a same attribute are equated as identical via the ontology-based dictionaries.

2. The system of claim 1, wherein each ontology-based dictionary contains a plurality of dictionary entries, each dictionary entry being an ontology element having one or more properties.

3. The system of claim 1, wherein each portal page is defined via a syntax describing the portal page, the syntax formatted in accordance with a markup language, and via specification of one or more of the ontology-based dictionaries.

4. The system of claim 3, wherein the syntax comprises a web ontology language.

5. The system of claim 1, wherein each portlet is defined at least via a first syntax describing a functionality of the portlet, and via specification of one or more of the ontology-based dictionaries.

6. The system of claim 5, wherein at least one of the portlets are each defined at least by using the ontology-based dictionaries via one or more of:
a second syntax describing one or more properties input into the portlet; and
a third syntax describing one or more properties output by the portlet.

7. The system of claim 6, wherein the first, second, and third syntaxes each comprise a web ontology language.

8. The system of claim 6, wherein the second syntax and/or the third syntax to facilitate cooperation between the portlets and the portal pages.

9. The system of claim 1, wherein the broker governs interaction among the portlets by using the ontology-based dictionaries in that properties of the portlets that are differently named but correspond to a same attribute are equated as identical via the ontology-based dictionaries to facilitate cooperation among the portlets.

10. A method comprising:
creating a portage page of a web portal, the web portal running on one or more computing devices:
describing the portal page at least by using one or more ontology-based dictionaries;
installing one or more portlets within the portal page, each portlet associated with the ontology-based dictionaries, each portlet proving content for the portal page;
a broker facilitating interaction between the portal page and the portlets by using the ontology-based dictionaries such that properties of the portlets and properties of the portal pages that are differently named but correspond to a same attribute are equated as identical via the ontology-based dictionaries; and,
displaying the portal page including the portlets on a display device for viewing by a user.

11. The method of claim 10, further comprising the broker facilitating interaction among the portlets by using the ontology-based dictionaries such that the properties of the portlets that are differently named but correspond to a same attribute are equated as identical via the ontology-based dictionaries.

12. The method of claim 10, wherein each ontology-based dictionary contains a plurality of dictionary entries, each dictionary entry being an ontology element having one or more properties.

13. The method of claim 10, wherein describing the portal page at least by using the ontology-based dictionaries comprises defining the portal page via a syntax describing the portal page, the syntax formatted in accordance with a markup language, and via specification of one or more of the ontology-based dictionaries.

14. The method of claim 10, wherein each portlet is defined at least via a first syntax describing a functionality of the portlet, and via specification of one or more of the ontology-based dictionaries.

15. The method of claim 14, wherein at least one of the portlets are each defined at least by using the ontology-based dictionaries via one or more of:
a second syntax describing one or more properties input into the portlet; and,
a third syntax describing one or more properties output by the portlet.

16. The method of claim 10, further comprising:
creating each portlet; and
describing each portlet at least by using the ontology-based dictionaries.

17. The method of claim 16, wherein describing each portlet at least by using the ontology-based dictionaries comprises defining each portlet at least via a first syntax describing a functionality of the portlet, and via specification of one or more of the ontology-based dictionaries.

18. The method of claim 17, wherein describing each portlet at least by using the ontology-based dictionaries further comprises also defining each portlet via one or more of:
a second syntax describing one or more properties input into the portlet; and
a third syntax describing one or more properties output by the portlet.

19. A non-transitory computer-readable medium having one or more computer programs stored thereon to perform a method comprising:
creating one or more portlets;
describing each portlet at least by using one or more ontology-based dictionaries;
creating a portal page of a web portal, the web portal running on one or more computing devices;
describing the portage page at least by using the ontology-based dictionaries;
installing the portlets within the portal page, each portlet providing content for the portal page;
a broker facilitating interaction among the portlets by using the ontology-based dictionaries such that the properties of the portlets that are differently named but correspond to a same attribute are equated as identical via the ontology-based dictionaries;
the broker facilitating interaction between the portal page and the portlets by using the ontology-based dictionaries such that properties of the portlets and properties of the portal pages that are differently named but correspond to a same attribute are equated as identical via the ontology-based dictionaries; and,
displaying the portal page including the portlets on a display device for viewing by a user.

20. The non-transitory computer-readable medium of claim 19, wherein the computer programs encompass a registry describing the portlets and the portal pages hosted by an instance of a portal server, to provide for improved search capabilities inside the portal.

* * * * *